Oct. 5, 1943.   H. HORLACHER   2,330,890
PROFILE MILLING MACHINE
Filed Dec. 13, 1939   4 Sheets-Sheet 1

INVENTOR.
HERMAN HORLACHER
BY
A. K. Parsons
ATTORNEY.

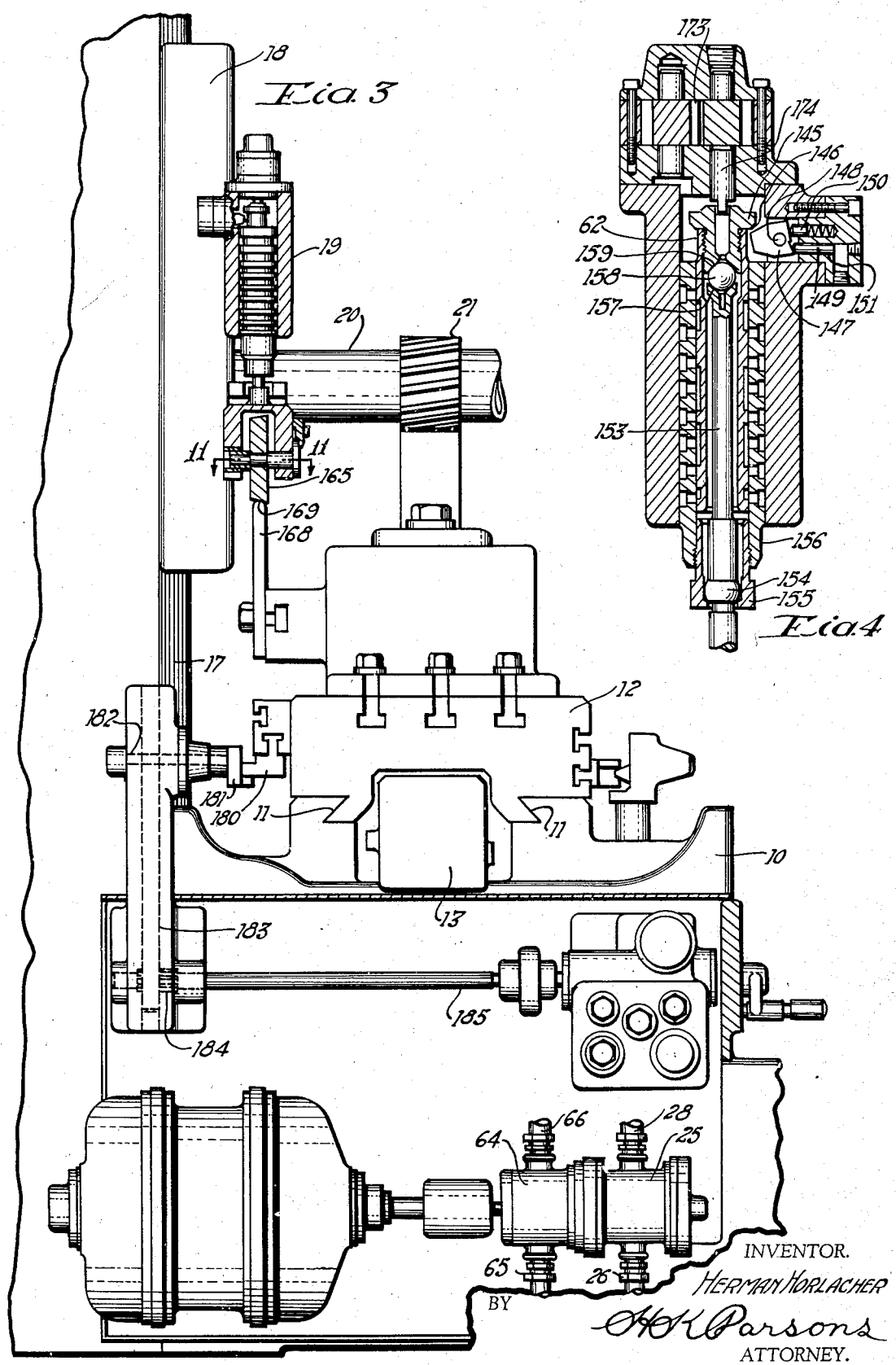

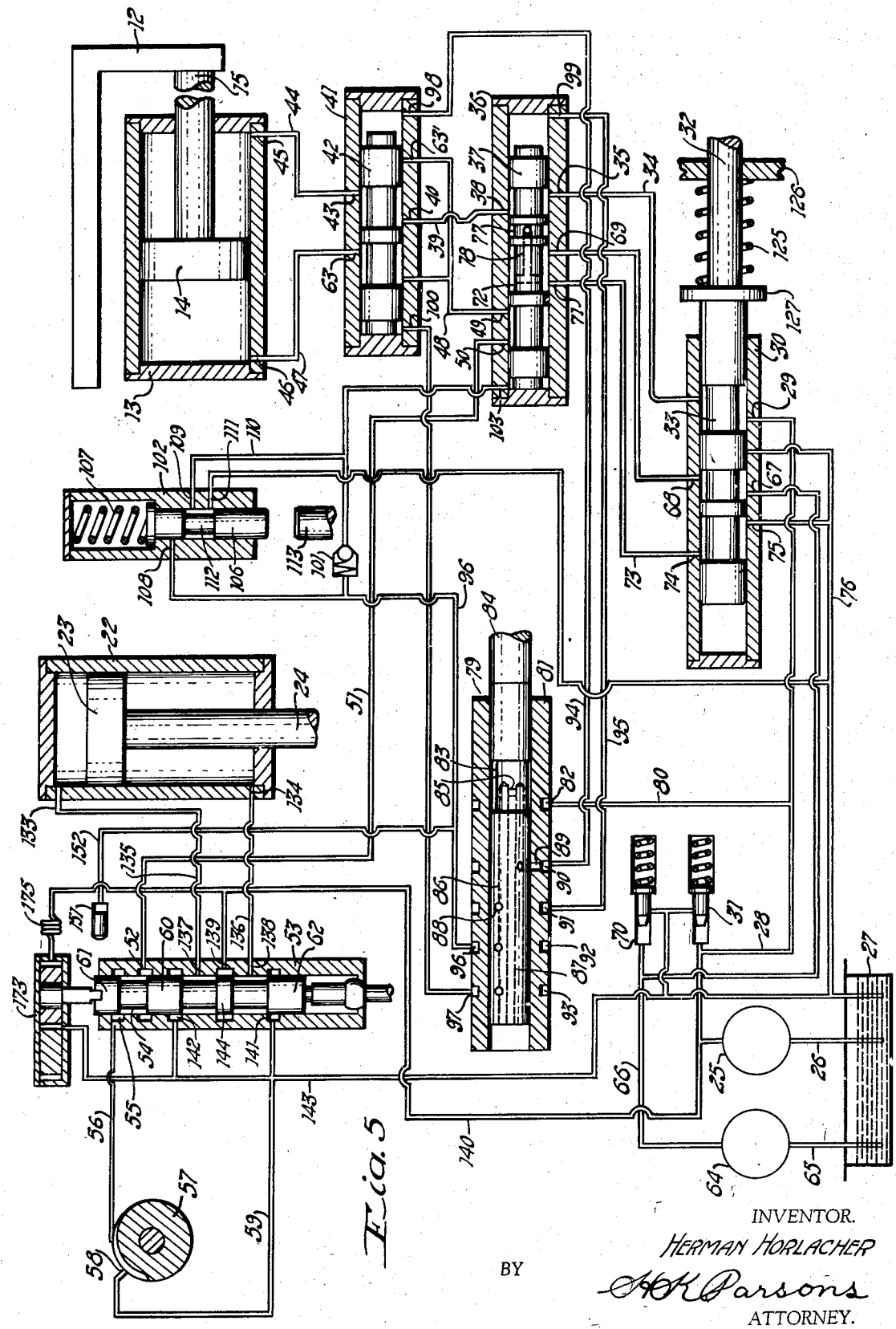

Oct. 5, 1943.                H. HORLACHER                 2,330,890
                        PROFILE MILLING MACHINE
                   Filed Dec. 13, 1939         4 Sheets-Sheet 4

INVENTOR.
HERMAN HORLACHER
BY AHK Parsons
ATTORNEY.

Patented Oct. 5, 1943

2,330,890

UNITED STATES PATENT OFFICE 2,330,890

PROFILE MILLING MACHINE

Herman Horlacher, Cincinnati, Ohio, assignor to The Cincinnati Milling Machine Co., Cincinnati, Ohio, a corporation of Ohio Application December 13, 1939, Serial No. 309,065

14 Claims. (Cl. 90—13.5)

This invention relates to milling machines and more particularly to improvements for utilizing such machines for profile milling purposes.

One of the objects of this invention is to provide improved means on a milling machine whereby tracer controlled profiling operations may be effected therewith.

Another object of this invention is to provide improved means for interlocking a tracer control mechanism with the table actuating mechanism whereby the tracer is effective during feeding movements and ineffective during rapid traverse movements.

A further object of this invention is to provide a tracer controlled machine with a simplified control means which is responsive to the rate controller for automatically stopping the feeding movement and effecting separation between the tracer and pattern and likewise between the cutter and work before the rapid traverse movement becomes effective.

An additional object of this invention is to provide a simplified delay mechanism which becomes effective after a rate control element has been shifted to its rapid traverse position to delay creation of the rapid traverse movement until certain machine elements have completed movement to a new position.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 3 is an end view of a portion of the machine shown in Figure 1 as viewed from the left of that figure and illustrating certain details of the machine.

Figure 4 is a section through the tracer controlled mechanism as viewed on the line 4—4 of Figure 1.

Figure 5 is a diagrammatic view of the hydraulic control circuit.

Figure 1:
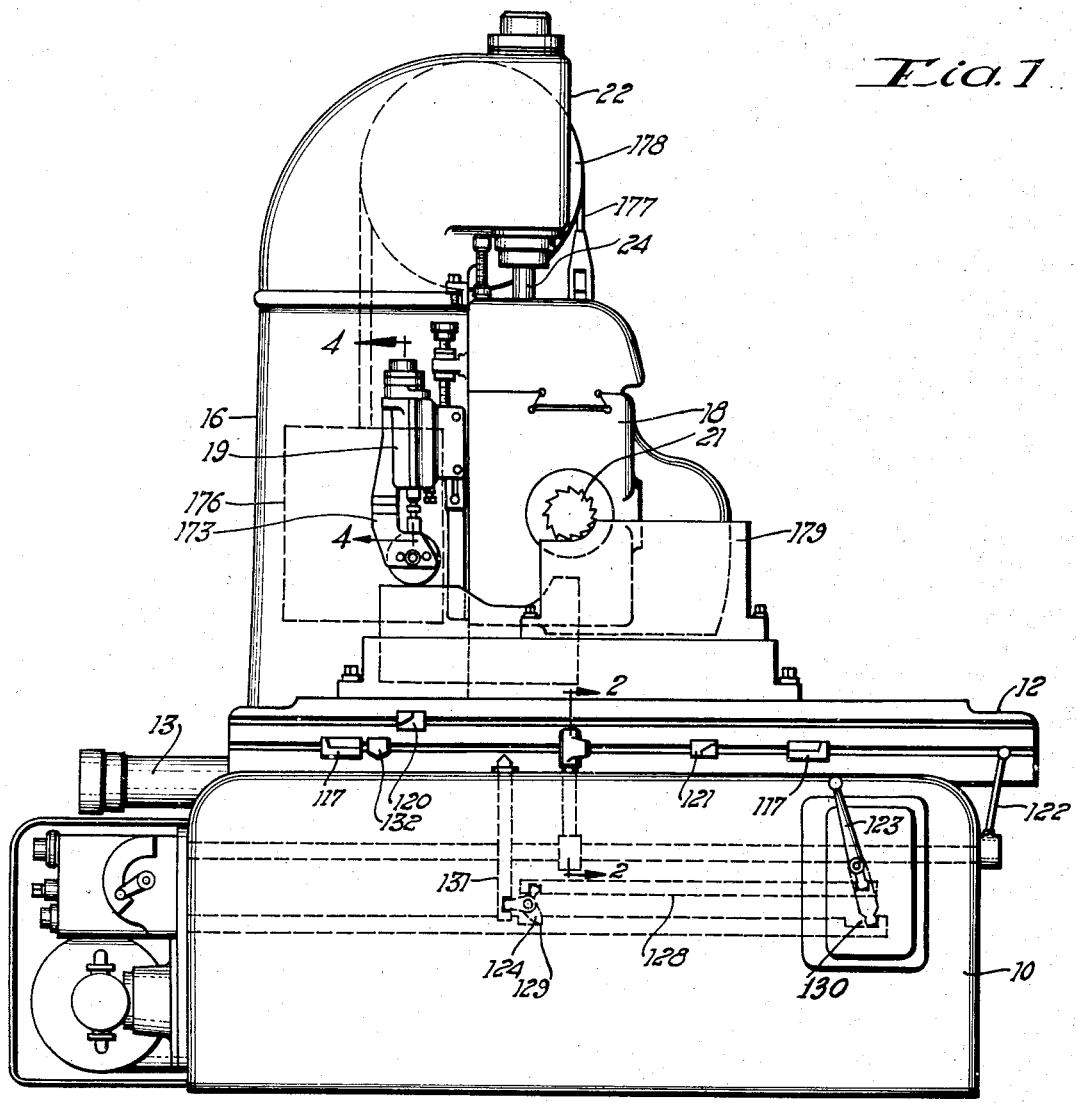
Figure 1 is a front elevation of a machine tool embodying the principles of this invention.

Referring to Figure 1 of the drawings the reference numeral 10 indicates in general the bed of the machine which, as shown in Figure 3, is provided with guideways 11 for guiding a reciprocating work table 12. The table is power reciprocated by a hydraulic motor consisting of a cylinder 13 and contained piston 14, the latter being connected by a piston rod 15 to the table 12, as shown in Figure 5.

Uprising from the rear of the bed 10 is a column 16 which has guideways 17, Figure 3, formed thereon for receiving and guiding a vertically movable spindle carrier 18 which carries the tracer control mechanism indicated generally by the numeral 19. The spindle carrier has a cutter spindle 20 journaled therein and suitable power driving means are provided for rotating the spindle and attached cutter which is indicated by the reference numeral 21. It will be noted that the cutter spindle lies parallel to the surface of the table 12, and means are provided for elevating the carrier and thereby effecting lateral movement of the cutter spindle with respect to the table.

The actuator for the spindle carrier or tool support consists of a hydraulic motor of the piston and cylinder type, comprising a cylinder 22 and contained piston 23, the latter being connected by a piston rod 24 to the carrier.

A hydraulic transmission and control mechanism is provided for reciprocating the table which is shown more particularly in Figure 5.

Refering to this figure, the reference numeral 25 indicates a feed pump having an intake 26 through which fluid is withdrawn from a reservoir 27, and a delivery channel 28 by which the pump is connected to port 29 of a start and stop control valve 30. A relief valve 31 is shown connected to the channel 28 for bypassing fluid to reservoir under excessive pressure. The start and stop control valve has a shiftable plunger 32, which is shown in running position in Figure 5, whereby the fluid will continue through the cannelure 33 and channel 34 to port 35 of a rate valve indicated generally by the reference numeral 36. The rate valve contains a shiftable plunger 37 which has a feed position, in which it is shown, and a rapid traverse position which is attained when the plunger is shifted to the right. In the feed position the port 35 is connected to port 38 and the fluid pressure continues through channel 39 to port 40 of a direction determining valve, indicated generally by the reference numeral 41.

This valve contains a shiftable plunger 42 which is shown in position to effect movement of the table 12 toward the left, and when shifted to the right it will effect movement of the table toward the right. In the position shown, the port 40 is connected to port 43 and the fluid pressure continues through channel 44 to the table cylinder port 45. Fluid from the other end of the cylinder returns through port 46, channel 47, valve 41 and channel 48 to port 49 of the rate valve 36. In the feed position of this valve the port 49 is interconnected with port 50 whereby the returning fluid continues through channel 51 to port 52 of the tracer valve, indicated generally by the reference numeral 53.

The port 52 is adapted to be connected by a cannelure 54 of this valve to port 55 and channel 56 which leads to an adjustable throttle valve 57. The throttle valve has a port 58 which is connected by a return channel 59 to the reservoir 27. Attention is invited to the fact that the spools 60 and 61 of the tracer valve plunger 62 are shown in a position to partially close ports 52 and 55 respectively.

This is the relationship of the parts when the tracer valve is in a neutral position as when following a straight profile extending parallel to the top of the table. It will now be evident that should the tracer valve be shifted in either direction from this neutral position that either port 52 or port 55 will be further closed, thereby imposing an additional throttle on the returning fluid and decreasing the feed rate of the table. Therefore, whenever the tracer is deflected to effect upward or downward movement of the spindlecarrier, the table feed rate is reduced.

To change the direction of table movement the plunger 42 of the reversing valve 41 is shifted to the right, whereby port 40 becomes connected to port 63 directing the pressure fluid to the left end of the cylinder, and port 43 becomes connected to port 63' directing the returning fluid to channel 48.

When it is desired to move the table at a rapid traverse rate, the output of a rapid traverse pump 64 is added to that of the feed pump by shifting the valve plunger 37 into its right hand position. The pump 64 has an intake 65 through which fluid is withdrawn from reservoir 27, and a delivery channel 66 by which it is connected through port 67 and port 68 of the start and stop valve 32, to port 69 of the rate valve 36. The channel 66 has the usual relief valve 70 connected thereto for bypassing fluid to reservoir should the pressure rise too high.

When the rate valve plunger 37 is in a feed position the port 69 is interconnected to port 71 by the annular groove 72 for returning the delivery of the rapid traverse pump to reservoir through channel 73, interconnected ports 74 and 75 of the stop valve, and return channel 76. When the plunger 37 is shifted to the right to a rapid traverse position the return channel 48 from the reversing valve is connected through interconnected ports 49 and 71 of the rate valve to the return channel 76 so that the returning fluid passes directly to reservoir rather than through the throttle valve 57.

In the rapid traverse position of plunger 37 the annular groove 72 connects the rapid traverse pump port 69 to port 38 to effect rapid movement of the table. The volumetric delivery of the rapid traverse pump is augmented at this time by the volumetric delivery of the feed pump in the following manner.

The feed pump port 35 registers at this time with an annular groove 77 in plunger 37 and this annular groove is connected by interdrilling 78 in the plunger to annular groove 72 whereby the flow from the feed pump may be added to the flow from the rapid traverse pump.

The shifting of the rate and direction valve plungers is remotely controlled through hydraulic power means by a pilot valve indicated generally by the reference numeral 79. Fluid pressure is conducted to the pilot valve from the pump 25 through branch 80 of pressure line 28. The valve includes a fixed distributor bushing 81 in which is formed a port 82 that serves to connect the line 80 to an annular groove 83 formed in the pilot valve plunger 84.

The plunger 84 is capable of an axial shifting movement to effect a change in table direction, and the groove 83 is made sufficiently wide to maintain registry with the port 82 during this shifting movement. The plunger 84 may also be rotated through a predetermined angle in either of its axial positions to effect a change in table rate.

Figure 6:
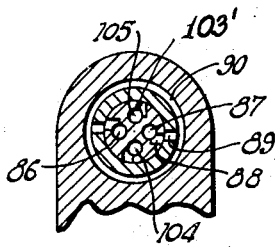
Figure 6 is a cross-sectional view of the pilot control valve.

A diametrical bore 85 drilled in the annular groove 83 connects the annular groove to two axially extending high pressure bores 86 and 87, Figure 6. Radial distributor passages, such as 88, conduct the fluid from the high pressure bores to ports 89 formed in the annular grooves 90, 91, 92 and 93 to which are connected channels 94, 95, 96 and 97. The passage 94 is connected to port 98 located in the right hand end of the direction valve 41; the channel 95 is connected to port 99 in the right hand end of the rate valve 36; channel 97 is connected to port 100 located in the left hand end of the direction valve, and the port 96 is connected in parallel through either a check valve 101 or an interlock valve 102 to port 103 located in the left end of the rate valve 36. The return flow through any of these channels is connected through radial distributor passages 103' similar to 88 to a pair of low pressure bores 104 and 105 extending longitudinally of the plunger 84 but open at one end whereby the fluid may discharge to reservoir. It is thus possible by proper positioning of the plunger to effect desired registry between the various distributor passages and the channel ports to effect the different position combinations of the rate and direction valve plungers to obtain either a fast rate or a slow rate of table movement for either direction of said movement.

Figure 7:
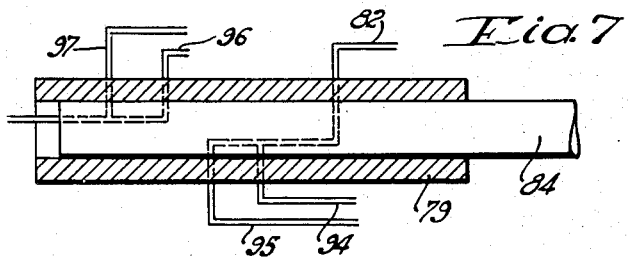
Figures 7, 8, 9 and 10 are views diagrammatically illustrating the different connections effected by the pilot valve.
Figure 8:
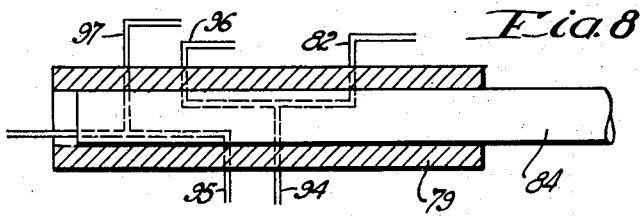

The hydraulic connections effected by the various positions of the pilot valve plunger are illustrated in Figures 7, 8, 9 and 10. In Figure 7 the pressure port 82 is connected to channels 94 and 95, thereby shifting plungers 37 and 42 to their left hand position, resulting in a feed left movement of the table. In Figure 8 the pressure port 82 is connected to channels 94 and 96 whereby the direction determining plunger 42 remains in the same position but the shifting of plunger 37 is prevented by the check valve 101 and the only other path for the fluid is through the interlock valve 102. This valve has a plunger 106 which is normally held in the position shown in Figure 5 by a spring 107.

In this position the port 108 is closed and the port 109 which is connected by branch line 110 to port 103 of the rate valve is connected to a reservoir port 111 by the annular groove 112 in plunger 106. It is, therefore, necessary for this plunger to be moved upward a sufficient distance to interconnect port 108 to port 109 before fluid can flow to port 103 and effect the rapid traverse position of plunger 37. This interlock valve is provided to insure that the spindle carrier 18 has been elevated to its upper position to move the cutter and tracer out of engagement with the work and pattern respectively before the rapid traverse movement sets in.

The carrier is, therefore, provided with an actuating dog 113 which is adapted to engage the end of the plunger 106 and shift it to a position interconnecting ports 108 and 109 as the carrier reaches the limit of its upper movement. When this has been accomplished the plunger 37 is then shifted to put into effect a rapid traverse movement.

Figure 9:
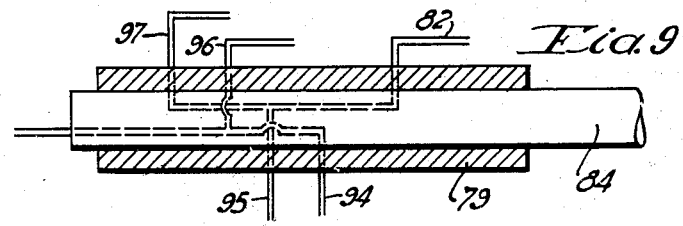

In Figure 9, the pressure port 82 is shown hydraulically connected to lines 97 and 95 whereby the direction plunger 42 is shifted to the right and the rate plunger 37 is shifted to the left which results in a feeding movement of the table to the right.

Figure 10:
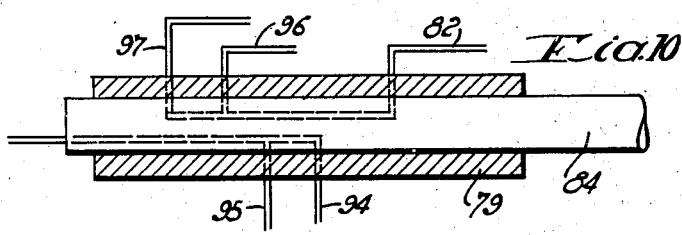
Figure 11:
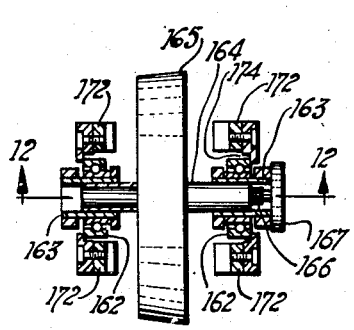
Figure 11 is a cross sectional view through the tracer roller support as viewed on the line 11—11 of Figure 3.

In Figure 10 the pressure port 82 is shown connected to lines 96 and 97 whereby the rate plunger 42 remains in the same position and the rapid traverse plunger at 37 will be shifted to the right when the interlock valve 102 is properly positioned.

Figure 2:
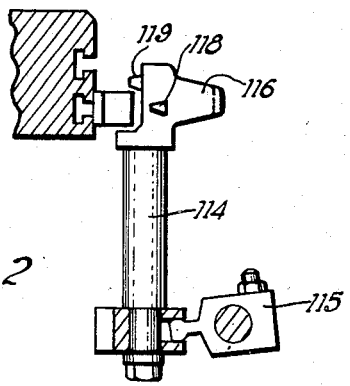
Figure 2 is a detail section on the line 2—2 of Figure 1 illustrating the trip control plunger.

The pilot valve plunger 84 is connected as shown in Figure 2 to an axially movable and rotatable trip plunger 114 by a ball-ended crank 115. From this figure it will be apparent that axial movement of the trip plunger 114 will effect rotation of the pilot valve plunger 84 which will effect a change in rate; and rotation of the plunger 114 will effect axial movement of the pilot valve plunger 84 which will effect a change in direction.

The trip plunger 114 has a radially extending wing 116 which is adapted to be alternately engaged by trip dogs 117 to effect opposite direction of rotation of the plunger; and a pair of lugs 118 and 119 which are adapted to be engaged by trip dogs 120 and 121 for effecting axial movement of the plunger. Thus, it is possible to effect automatically changes in the rate and direction of movement of the table.

The pilot valve plunger extends to the end of the bed as shown in Figure 1 and is provided with a manually operable handle 122 which is supported for universal movement so as to effect rotation or axial movement of the plunger 84.

The stop valve plunger 32 extends longitudinally of the bed and is provided with a manual control lever 123. The plunger 32 is normally held in its running position by a latch 124 against the compression of a spring 125 which, as shown in Figure 5, is interposed between a fixed part 126 of the machine and a flange 127 formed on the plunger 32. When the latch 124 is withdrawn from engagement with the plunger 32 the spring 125 shifts the plunger to a stop position. Rotation of the lever 123 in a counterclockwise direction will shift the stop plunger 32 toward the right as viewed in Figure 1, and by means of the linkage connection 128 the pawl 124 will drop into the slot 129 to hold the stop valve in running position. By providing a lost motion connection at 130, the lever 123 may be rotated clockwise to effect withdrawal of the pawl 124. The pawl may also be withdrawn automatically upon downward actuation of trip plunger 131 by dog 132.

The table may thus be manually or automatically controlled as to rate, direction or stopping.

The spindle carrier 18 which is actuated by the piston 23 is capable of a positioning movement to bring the cutter down to the work or to effect retraction of the cutter as during substitution of new work; and also of a working movement in which the cutter is automatically moved laterally in accordance with the configuration or outline of a pattern or master under control of a tracer in contact with said master. The flow of hydraulic fluid to the cylinder 22 is controlled by the tracer valve plunger 62 and means are provided for utilizing this plunger to control the two different kinds of movement of which the spindle carrier is capable, but different control means are provided for actuating the plunger for each kind of movement.

Remote control means are provided for positioning the plunger to effect the positioning movements of the spindle carrier and this means may be actuated automatically in accordance with the machine cycle or actuated at will by the operator either during a machine cycle or while the table is stopped. A tracer mechanism is provided for governing the actuation of the plunger during the actual profiling or cutting of the work.

The cylinder 22 has ports 133 and 134 at opposite ends which are connected by channels 135 and 136 to ports 137 and 138 respectively of the tracer valve. This valve has an intermediate pressure port 139 which is supplied with fluid through branch 140 of channel 28 which is supplied with fluid pressure at all times. The tracer valve is also provided with a pair of exhaust ports 141 and 142 which are operatively connected to the return line 143. The tracer valve plunger 62 has a central spool 144 which normally is in a position to close the pressure port 139 but when the plunger is shifted upward the pressure port 139 is uncovered and fluid flows through port 138 and channel 136 to port 134 of cylinder 22 to cause upward movement of the spindle carrier. When the tracer valve plunger is shifted downward, the pressure port 139 is connected to port 137 and fluid flows through channel 135 to port 133 of cylinder 22 to effect downward movement of the spindle carrier. When the plunger 62 is moved upward the port 137 is connected to exhaust port 142 and when the plunger is moved downward port 138 is connected to port 141, whereby the fluid in the low pressure end of cylinder 22 may be exhausted to reservoir.

Referring to Figure 4, the plunger 62 which is tubular in construction has a plug 145 threaded in the upper end thereof and this plug provides a shoulder 146 which is engageable by a fluid rotatable lever 147 to effect upward movement of the plunger. The lever 147 is pivoted at 148 for rotation clockwise by a fluid operable plunger 149 and rotation counterclockwise by a spring operated plunger 150. The plunger 149 slides in a bore 151 which is in the form of a cylinder and this cylinder as shown in Figure 5 is connected by channel 152 to channel 96. It is through this latter channel that fluid is directed by the pilot valve to effect shifting of the rate valve plunger to a rapid traverse position. It will, therefore, be apparent that whenever the rate of movement of the table is changed to rapid traverse, that the tracer valve plunger is shifted automatically to an extreme upward position through remote control means, thereby effecting upward movement of the spindle carrier. When this movement has been completed the interlock valve plunger 106 is actuated to complete the circuit to port 103 whereby the rapid traverse plunger is then actuated to actually effect the rapid traverse movement of the table. At all other times the channel 96 is connected to reservoir whereby the spring pressed plunger 150 retracts the lever 147, leaving the tracer valve plunger free to fall by gravity.

If the machine is started at a feed rate the fall of the tracer valve plunger will be sufficient to connect ports 139 and 137 and cause a rapid downward movement of the spindle carrier. This movement will be terminated when the tracer engages the pattern. The tracing mechanism includes a lever 153 which has an integral ball-shaped portion 154 that is adapted to seat on the support 155 threaded in the end of the fixed sleeve 156 of the tracer valve. At the upper end this lever is provided with a conical-shaped seat 157 for receiving a ball 158 which is interposed between the end of the lever and the plug 145 threaded in the upper end of the valve plunger 62. This plug has a conical-shaped seat 159 which engages the ball, and the weight of the plunger tends to centralize the position of the tracer arm 153 axially of the plunger. It will, therefore, be seen that the tracer arm 153 when resting on the seat in the support 155 limits the extent of the downward movement of the tracer valve plunger.

Figure 12:
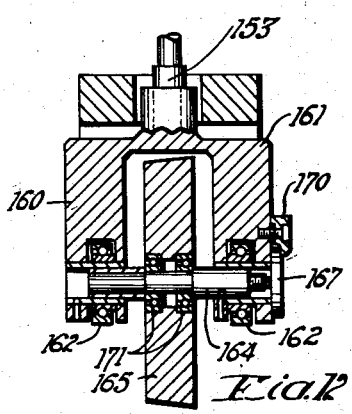
Figure 12 is a sectional view taken on the line 12—12 of Figure 11.

The tracer arm 153 is provided with a bifurcated end as shown in Figure 12 comprising two arms 160 and 161. The end of each arm is also bifurcated to form a slot for receiving anti-friction bearings 162. These bearings are mounted on tubes 163 which form journals for the supporting shaft 164 of the tracer roller 165. The shaft 164 has a threaded bore in one end in which is threaded an adjusting screw 166, the screw having an enlarged head 167. The tracer roller 165 is conical-shaped, thereby making an element of its periphery inclined to its axis. The master plate, 168, as shown in Figure 3, has a rounded edge 169 and the purpose of this construction is to provide for lateral adjustment of the roller 165 to compensate for changes in the diameter of the cutter due to sharpening operations.

By rotating the head 167 the screw and nut connection effects axial shifting of the shaft 164. When this shifting has been accomplished a locking element 170 is tightened to prevent further rotation of the parts. Since the shaft 164 does not rotate, the roller 165 is supported by anti-friction bearings 171 on the shaft 164 for relative rotation with respect thereto.

The anti-friction bearings 162 serve as guide means to prevent lateral movement of the tracer arm 153 being engaged by fixed parts 172 of the depending bracket 173 shown in Figure 1. A slight clearance 174 is provided, however, between the periphery of the ball bearings 162 and the fixed portions 172 whereby the roller 165 may move laterally a predetermined amount as respects its axis whereby an upward incline in the pattern may be anticipated which will cause lateral movement of the tracer arm 153 and cause the ball 158 shown in Figure 4 to ride out of its conical seat and cause upward movement of the tracer valve. This will start the upward movement of the spindle carrier and subsequent axial movement of the tracer arm will cause further opening of the valve to increase the rate of upward movement if the incline on the profile continues. This tends to ease the beginning of an upward movement as otherwise if the tracer arm were held rigidly against lateral movement a severe strain would be placed on the parts in initiating upward movement of the tracer valve.

In other words, the weight of the valve member 62 acting on the ball 158 serves as a means to centralize the tracer arm 153 and restrain it against lateral movement, while the abutments 172 serve as positive means for limiting the extent of lateral movement upon yielding of the centralizing means.

In order to prevent dirt particles from accumulating between the tracer valve and corresponding ports, means are provided for rotating the valve including a fluid operated gear motor 173 which, as shown in Figure 4, is mounted in the top of the tracer housing having one shaft 174 depending into operative engagement with the upper end of the valve. The motor 173 is supplied with fluid pressure from channel 140 through a hydraulic resistance 175 as shown in Figure 5.

In order to prevent the spindle carrier 18 from dropping when the machine is shut down and there is no hydraulic pressure, a counterbalance weight 176 is operatively connected to the carrier by means of a cable 177 which passes over a sheave 178 that is rotatably mounted in the upper part of the column 16 as shown in Figure 1. This weight plus the friction of the guideways is sufficient to maintain the spindle carrier in any given vertical position in case the hydraulic pressure fails.

An illustrative cycle of operation of the machine will now be explained. Assuming that a work piece, such as 179, is suitably attached to the table and a template having the desired profile to be reproduced is secured in position and bearing the same relation to the tracer roller that the work piece bears to the cutter, the machine is ready for a cutting operation. It will further be assumed that the table is in a right position ready to start movement toward the left and that the spindle carrier is up.

If it is desired to provide for variation of the feed rate during the cutting operation, a feed rate control cam 180 may be attached to the rear of the table, as shown in Figure 3, for actuation of a crank 181 secured to the end of a pinion shaft 182. This shaft is operatively connected through a rack 183 and a second pinion 184 to a shaft 185 which serves to rotate the throttle valve 57. With the machine properly loaded the operator prepositions the rate and direction control lever 122 to set the pilot valve in a rapid traverse left position and then throws the stop lever to a running position.

After a predetermined movement at a rapid traverse rate, the trip dog 120 depresses the trip plunger 114 to a feed rate position which simultaneously and automatically causes the spindle carrier to descend at a rapid traverse rate until the tracer roller engages the template 168. This stops the downward movement of the spindle carrier and the table moves at a feed rate. The cutting operation then proceeds with the rate of table movement varying under control of the feed rate cam, if the same is utilized, and the spindle carrier is automatically moved up or down as dictated by the template 168.

At the end of the cutting operation a second dog such as 121 moves the trip plunger 114 upward, changing the rate of table movement to rapid traverse. The spindle carrier will automatically move upward to its retracted position with the table stopped due to the fact that the rate valve plunger is in a rapid traverse position, but the rapid traverse movement cannot be instituted until the spindle carrier has completed its upward movement.

A reversing dog, such as 117, rotates the plunger 114 to change the direction of table movement and the parts returned to starting position at a rapid rate. If desired, an automatic stop dog 132 may be utilized to stop the movement of the table before the reversing dog 117 becomes effective to start a new cycle.

There has thus been provided an improved automatic profiling machine having an improved tracer control mechanism, and an interlocking mechanism with the table control mechanism whereby an improved cycle of operation may be accomplished and a machine provided for automatically producing profile surfaces in a safe and efficient manner.

I claim:

1. In a milling machine having a cutter support and a work support, the combination with power operable means for effecting relative movement between the supports at a feeding rate or a rapid traverse rate, of a tracer carried by one of said supports for engagement with a pattern carried by the other support, means controlled by the tracer for governing movement of one of said supports toward and from the other support during the feeding movement, a rate controller shiftable to change the feed rate to a rapid traverse rate, means simultaneously operated thereby for causing the tracer to effect separation of the supports, and means to delay said rapid traverse movement from becoming effective until said separation has been completed.

2. In a machine tool having a tool support and a work support, the combination of power operable means for effecting a relative feeding movement between the supports, a tracer carried by one of said supports for engaging a pattern carried by the other support, means governed by the tracer during contact with the pattern for controlling movement of one support toward and from the other support in accordance with variations in the contour of said pattern, and means to change the feed rate to a rapid traverse rate and simultaneously cause the tracer to effect separation of the supports.

3. In a milling machine having a cutter, a cutter support and a work support, a tracer carried by one of said supports for engagement with a pattern carried by the other support, the combination of power operable means for effecting a relative traversing of one of said supports at a feed rate, a control member having a rapid traverse position, means operable by said member upon movement to its rapid traverse position to cause the tracer to effect separation between the supports and thereby disengagement of the cutter from the work, and means controlled by the separating support for instituting said rapid traverse movement.

4. In a milling machine having a cutter support and a work support, a tracer mounted on one of said supports and a pattern mounted on the other, the combination of power operable means for shifting said table at a rapid traverse rate, control means actuable to change said rapid traverse rate to a feed rate, and additional means responsive to operation of said control means to cause the tracer to effect a positional shift of the cutter support toward the work support and thereby engagement of the tracer with the pattern.

5. In a milling machine having a cutter support and a work support, a tracer mounted on one of said supports and a pattern mounted on the other of said supports, the combination of a power transmission for effecting a relative traversing movement between said supports including a rate selector having a feed position and a rapid traverse position, means simultaneously controlled by said selector when shifted to a feed position to cause the tracer to effect movement of the cutter support toward the work support, and when shifted to a rapid traverse position to cause the tracer to effect movement of the cutter support away from the work support.

6. In a milling machine having a work support and a spindle carrier movable toward and from the work support, the combination with a tracer carried by said spindle carrier for engagement with a pattern carried by the work support, of power operable means for feeding the work support, means controlled by the tracer for causing movement of the spindle carrier toward and from the work support, a control lever shiftable to a rapid traverse position for changing the rate of movement of said table, means controlled by said lever for automatically positioning said tracer valve to cause movement of the spindle carrier away from the work support, and interlock means controlled by said spindle carrier for preventing rapid traversing of the table until the carrier has been retracted.

7. In a milling machine having a work support and a cutter support, the combination with a tracer mounted on the cutter support for controlling relative movement of the latter toward and from the work support, of power operable means for feeding the table with the tracer in engagement with a pattern, control means for said power operable means including a first control lever effective to stop said feeding movement, a second control lever for controlling the rate of table movement, and additional means controlled by said second lever when the table is stopped to effect separation of the cutter support from the work support.

8. In a milling machine having a work support and a ctuter support, the combination of power operable means for effecting movement of the cutter support toward and from the work support, a tracer mounted on the cutter support for engaging a pattern mounted on the work support to control said power operable means whereby a cutter carried by the cutter support will reproduce the contour of a pattern, power means for feeding the work support at a normally constant rate, and means carried by the table for controlling variations in said rate automatically and independently of the tracer.

9. In a milling machine having a cutter support and a work support, the combination with power operable means for driving the table, of a stop control lever and a rate control lever, and means to utilize said rate control lever when the stop lever is in a stop position to effect movement of the tool carrier toward and from the work support.

10. In a milling machine having a work support and a tool carrier guided for movement relative to the work support, the combination of fluid operable means for shifting said carrier, a source of fluid pressure, a control valve for controlling the coupling of said source of pressure to said fluid operable means, remote control means for positioning said valve to produce rapid movement of the carrier, a tracer arm mounted on the carrier and operatively connected to said control valve, and means on the tracer arm adapted to engage a template carried by the work support for pattern controlling the movement of said control valve.

11. In a milling machine having a work support and a spindle carrier guided for movement relative to the work support, the combination of power operable means for traversing said work support including rate control means, a manually operable control lever for effecting power positioning of said rate control means, fluid operable means for shifting said spindle carrier, a control valve for said last-named means and operatively connected for remote control from said lever, and means for disabling said rate control means whereby the lever may be utilized for controlling sole actuation of the spindle carrier.

12. In a pattern controlled machine tool having a work supporting table and a slide movable toward and from the table, a rotatable cutter and a tracer supported on the slide, said tracer being adapted to engage a pattern mounted on the table, the combination of power operable means controlled by the tracer for causing movement of the slide toward and from the table during traversing thereof in accordance with variations in the profile of the pattern, power operable means for traversing the table selectively at a feed rate or a rapid traverse rate, and means trip controlled by the table for causing engagement of the tracer with the pattern when a feed rate is instituted and for causing disengagement of the tracer from the pattern when a rapid traverse rate is instituted.

13. In a milling machine having a work support and a cutter support, a cutter mounted on the cutter support, the combination of a tracer mounted on said cutter support for scanning a pattern carried by the work support, power operable means controlled by the tracer for moving the cutter support toward and from the work support, power operable means for translating the table at fast or slow rates and a control means for said last-named power operable means and positionable for effecting either of said rates and simultaneously causing engagement of the tracer with the pattern in one rate position and disengagement of the tracer from the pattern for the other rate position, and other means for starting and stopping the table with the tracer in either position.

14. In a milling machine having a cutter support and a work support, the combination with fluid operable means for traversing one of said supports at a feed rate or a rapid traverse rate, a second fluid operable means for advancing the other support toward and from the traversing support, a rate selector control valve for said first-named fluid operable means, a tracer carried by one of said supports for scanning a pattern carried by the other support, a tracer controlled valve for governing operation of the second-named fluid operable means, a fluid operable actuator operatively connected for also shifting said tracer controlled valve, a pilot valve for remotely controlling the position of said rate selector valve, and means coupling said actuator and said rate selector valve in parallel with said pilot valve whereby during feeding rates the tracer will be engaged with the pattern and during rapid traverse rates the tracer will be disengaged from the pattern.

HERMAN HORLACHER.